Nov. 13, 1962   R. J. CASSIDY   3,064,102
THERMORESPONSIVE SWITCH MEANS
Filed March 13, 1957   2 Sheets-Sheet 1
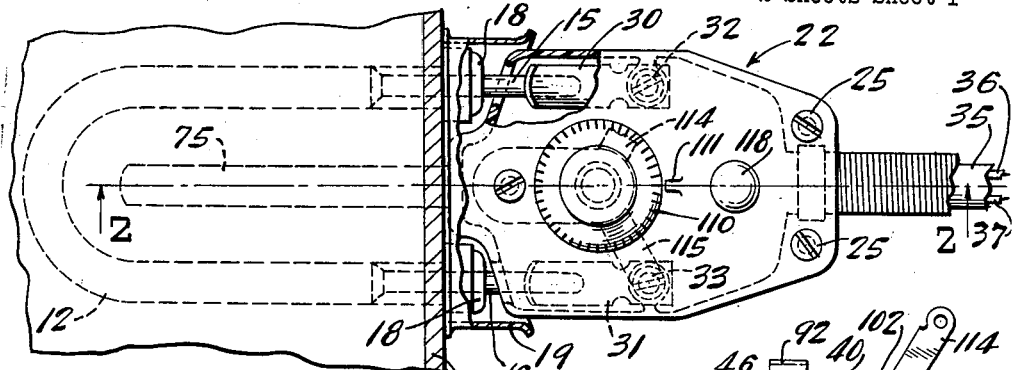
FIG-1-
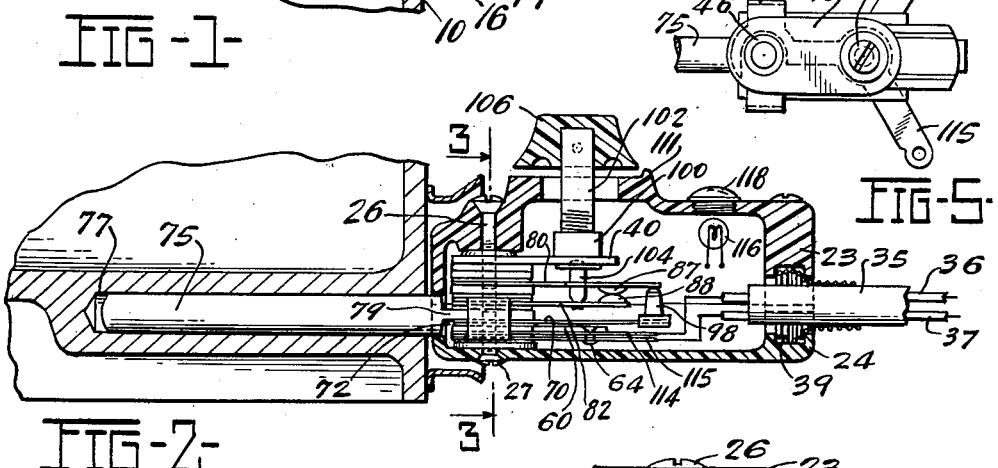
FIG-2-
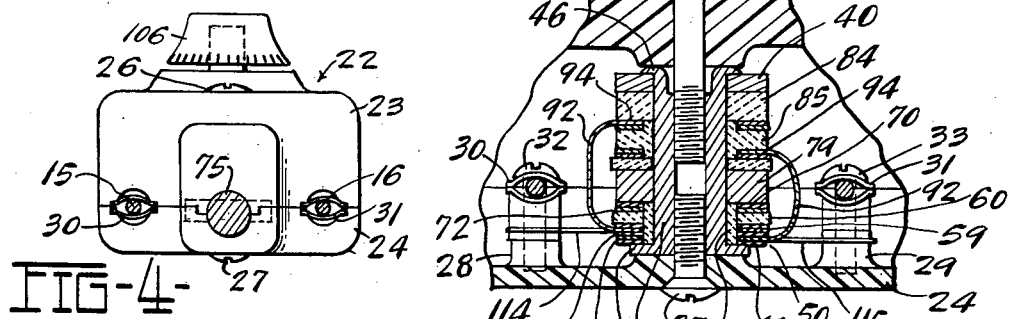
FIG-4-   FIG-3-
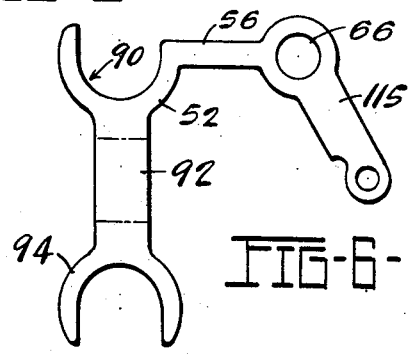
FIG-6-
INVENTOR:
ROBERT J. CASSIDY.
BY
Harry O. Ernsberger
ATTY.

Nov. 13, 1962  R. J. CASSIDY  3,064,102
THERMORESPONSIVE SWITCH MEANS
Filed March 13, 1957  2 Sheets-Sheet 2
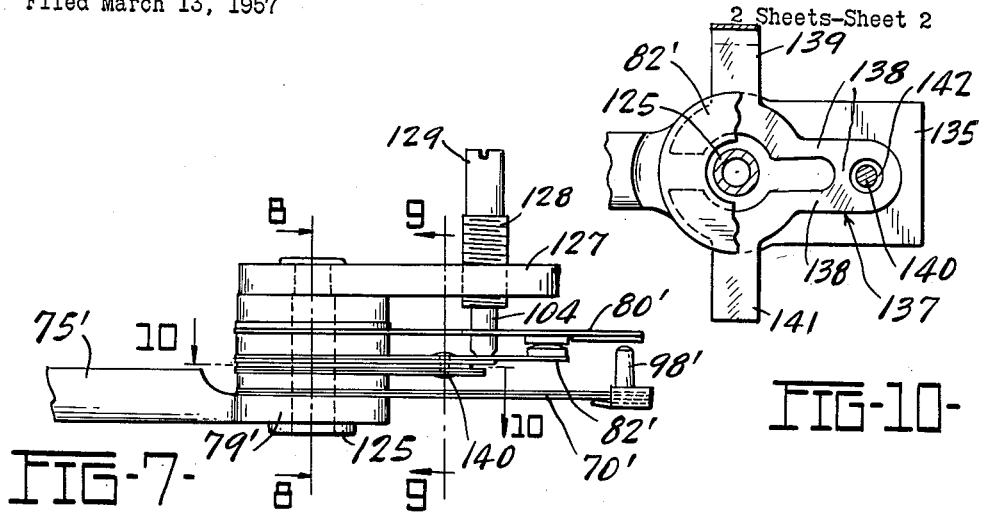
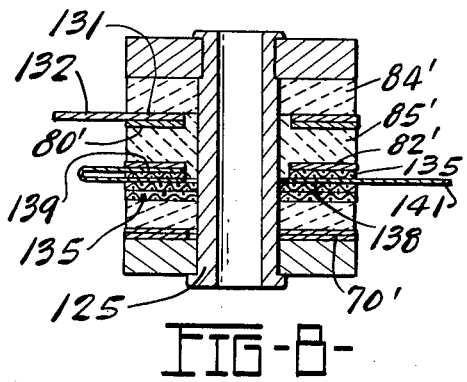
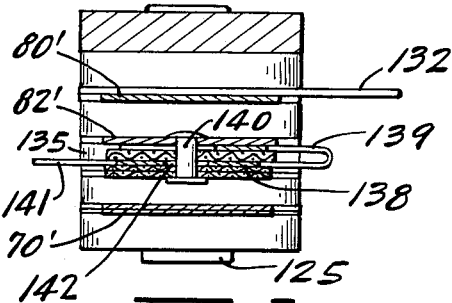
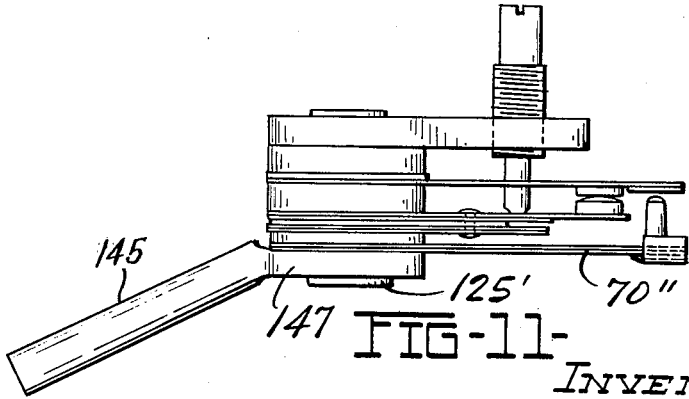
INVENTOR:
ROBERT J. CASSIDY.
BY Harry O. Ernsberger
ATTY.

United States Patent Office 3,064,102
Patented Nov. 13, 1962

3,064,102
THERMORESPONSIVE SWITCH MEANS
Robert J. Cassidy, Mansfield, Ohio, assignor to Pace, Inc., Mansfield, Ohio, a corporation of Ohio
Filed Mar. 13, 1957, Ser. No. 645,846
3 Claims. (Cl. 200—122)

This invention relates to switch mechanisms and more especially to manually adjustable switch mechanisms embodying thermoresponsive means for maintaining automatic control of a circuit of an electrically energizable heating means of an appliance or heating unit.

In the manufacture of electrically heated cooking utensils such, for example, as electrically heated skillets, the handle portions of such appliances have been equipped with permanently installed, manually controllable, thermostat switch means for the purpose of automatically controlling the heating of the appliance within conventional temperature range provided by the movement of a bimetallic element under the influence of heat from the appliance. In appliances of this character a metallic rod is embodied in the appliance for the purpose of transmitting heat from the appliance to a bimetallic element.

While appliances of this character having permanently integrated thermostat control means have been substantially satisfactory within the temperature control range of the bimetallic element, the transfer of heat to the bimetallic element has not been efficient resulting in too great a temperature spread between "on" and "off" conditions of the circuit to provide a desirable accurate control of the temperature of the appliance. Furthermore appliances having integrated controls of this character are expensive and the control is usable only with the appliance in which it is incorporated.

The present invention embraces the provision of a manually adjustable thermoresponsive switch means of the probe type which is formed or fashioned as an integrated separate unit for adaptation and use with various appliances such as skillets, roasters, cookers, grills, electric heating irons and the like whereby the single control unit may be transferred from one appliance to another and thus serve as a control means for several appliances.

An object of the invention is the provision of a separable current connector of the probe thermostat type wherein the probe element for transmitting heat to the bimetallic thermoresponsive means in the switch mechanism may be oriented in metallic contact or engagement with the bimetallic element or thermoresponsive means to facilitate transmission of heat to the bimetallic element in a manner whereby the movement or flexure of the bimetallic element is accelerated to obtain and maintain a more accurate temperature control of the appliance.

Another object of the invention is the provision of a thermoresponsive switch means of the probe type wherein the switch components, in assembly, are in stacked relation and wherein the probe element is incorporated in the stack assembly providing a unitary and compact construction wherein heat transfer from the probe bar to the thermoresponsive means is rapid and effective to maintain the temperature of the appliance within a very narrow temperature range.

Another object of the invention is the provision of a manually adjustable thermoresponsive switch means incorporating a supplemental heating means associated with the thermoresponsive means or element of the construction oriented in such a manner that the temperature range of the automatic operation of the thermoresponsive means is maintained within a narrow range whereby a substantially uniform heating of the appliance may be attained.

A further object of the invention is the provision of means arranged adjacent a thermoresponsive component of a switch mechanism for supplying supplemental heat to accelerate operation of the thermoresponsive element whereby an abnormally high temperature or "over shooting" of the temperature of the appliance from an initial "cold" or unenergized condition is greatly reduced and the temperature of the heated appliance maintained at a more nearly uniform or constant temperature, the temperature being determined by manual adjustment of the position of a switch contact or conductor of the switch mechanism.

Still a further object of the invention is the provision of a thermoresponsive switch means of the probe type wherein the arrangement for transmitting heat variations of the appliance to the bimetallic or thermoresponsive means is effective to foster rapid cycling of the circuit controlling switch contacts whereby a substantially constant or uniform temperature of the appliance is automatically maintained within minor temperature variations or deviations for a median temperature desired as predetermined by the manual adjustment of a component of the switch means.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a plan view partly in section illustrating a portion of an electrically-heated appliance and a combined thermoresponsive switch means and probe heat transfer element integrated as a control unit and current connector;

FIGURE 2 is a longitudinal sectional view through the control unit and the portion of the appliance illustrated in FIGURE 1, the view being taken substantially on the line 2—2 of FIGURE 1;

FIGURE 3 is an enlarged fragmentary transverse sectional view taken substantially on the line 3—3 of FIGURE 2;

FIGURE 4 is an end view of the circuit controlling unit shown in FIGURES 1 through 3;

FIGURE 5 is a top plan view of the switch construction forming part of the invention;

FIGURE 6 is a plan view of one of the current conductors and supplemental heating means for influencing the thermoresponsive element of the switch mechanism;

FIGURE 7 is an elevational view illustrating a modified form of a probe type thermoresponsive switch means;

FIGURE 8 is a transverse sectional veiw taken substantially on the line 8—8 of FIGURE 7;

FIGURE 9 is a transverse sectional view taken substantially on the line 9—9 of FIGURE 7;

FIGURE 10 is a sectional view taken substantially on the line 10—10 of FIGURE 7, and FIGURE 11 is an elevational view of a probe type thermoresponsive switch mechanism illustrating a modified position of the probe element of the construction.

While the switch mechanism embodying a thermoresponsive means and a heat-transferring probe element is especially adapted as a unit connector and circuit controlling means for use with various types and kinds of appliances embodying electrical heating units, it is to be understood that the arrangement of the invention may be utilized with appliances and devices wherever thermostatic control of a circuit may be desirable or necessary.

Referring to the drawings in detail and first with respect to the arrangement shown in FIGURES 1 through 6, a portion of an appliance 10 is illustrated in FIGURES 1 and 2 which embodies an electrically-energizable heating element or heating unit 12. As shown in FIGURE 1, terminal prongs 15 and 16 are connected with the end zones of the electrically energizable heating unit 12. The prongs 15 and 16 are supported in suitable insulating members 18 surrounding the prongs at their region of entry into the appliance 10.

The arrangement of the present invention embraces a circuit controlling unit which is readily connectable with and removable from an appliance so that it may be utilized with various appliances fashioned to accommodate a probe bar. The switch mechanism and thermoresponsive means is enclosed within a suitable housing 22 formed of suitable insulating material and comprises upper and lower components 23 and 24 which are joined together by means of screws 25, 26 and 27, the screws 26 and 27 engaging a frame component of the switch mechanism in a manner hereinafter explained.

In the embodiment illustrated, the lower component 24 of the housing construction is formed interiorly with upwardly extending boss portions 28 and 29 which respectively support female connector clips or terminals 30 and 31 which are secured to the boss portions by means of screws 32 and 33. The clips 30 and 31 are fashioned or shaped to receive the connector prongs 15 and 16.

The housing components 23 and 24 at the rear region thereof are formed with semi-circular recesses to accommodate the insulation sheath 35 encasing or enclosing current supply conductors or wires 36 and 37 arranged to be connected with a current supply. The recesses in the components 23 and 24 are shaped to also accommodate a coiled spring-like member 39 which surrounds the insulation sheath 35 at its region of entry into the housing 22 in order to protect the current conductors against acute flexure.

The switch mechanism, the thermoresponsive means and the heat transferring probe or bar in the present invention are built up or assembled into a so-called "stack" which provides a sturdy and compact construction occupying a comparatively small space. The switch mechanism is inclusive of frame components comprising a plate or member 40 which carries a switch adjusting means hereinafter described, the plate 40 being formed with an opening into which extends an end region of a cylindrical sleeve or member 42. The lower end region of the sleeve 42 terminates in a flange portion 4 and the upper portion of the sleeve is riveted over the plate 40 as shown at 46. In this manner, the various components and elements of the switch and thermoresponsive means are held in fixed assembled relation on the sleeve 42.

Disposed adjacent the flange 44 of the sleeve are alternate layers or sheets of mica or other suitable heat resistant insulation 48 and disposed between adjacent sheets of mica so as to be insulated from each other are current conducting members 50 and 52 of substantially identical shape, one of such members being illustrated in FIGURE 6. The member 52 shown in FIGURE 6 is illustrated in expanded position before being configurated or shaped to the position shown in FIGURE 3. The members 50 and 52 are provided with connecting portions 56 of restricted cross-section so that the passage of current through the restricted section generates heat due to the resistance of the passage of current through the restricted sections.

Disposed adjacent the upper mica sheet or insulating member 59 is a heat retarding metal plate 60 which is insulated from the members 50 and 52 and the sleeve 42 by means of a sleeve 62 of suitable heat resistant insulating material such as ceramic or lava. As particularly shown in FIGURE 2, the metal plate 60 is coextensive with the mica sheets 48 and 59 and is secured in fixed relation with the current conducting members 50, 52 and the mica sheets by means of a rivet 64 which extends through enlarged openings 66 in the current conducting members 50 and 52 but is insulated therefrom by suitable means (not shown).

Disposed adjacent the upper surface of the plate 60 is a bimetallic element or thermoresponsive means 70 which is insulated from the plate 60 by means of a mica sheet 72. The bimetallic, thermoresponsive element or means 70 is fashioned of two strips of metal joined or bonded together throughout their length. The strips of metal have dissimilar coefficients of expansion whereby variations in temperature ambient the bimetallic element 70 causes flexure thereof.

Extending from the switch assembly is a heat transferring element or probe 75 which may be in the form of a metal bar or rod adapted to extend into an opening 77 formed in the appliance so as to facilitate the efficient transfer of heat to the bimetallic or thermoresponsive element 70.

As shown in FIGURE 4, the probe element or bar 75 is of circular cross section and is of a dimension to snugly, yet slidably fit into the opening 77 formed in the appliance to receive the probe. The probe is preferably formed of a metal such as aluminum which is a good conductor of heat in order to effect a rapid transfer of heat to the bimetallic element 70. As particularly shown in FIGURE 2, an end region of the probe 75 is formed with a flattened portion 79 having an opening therein to snugly fit over the sleeve 42 of the switch assembly as shown in FIGURE 3.

Flexible switch members or blades 80 and 82 are also mounted upon the sleeve or frame member 42 and are insulated therefrom by means of collars or washers 84 and 85 formed of heat resistant insulating material such as lava or ceramic. The switch members 80 and 82 are provided respectively with contacts 87 and 88 which, when in engagement, complete a circuit through the heating element 12 in the appliance and through the heating sections 56 of the members 50 and 52.

Each of the members 50 and 52 is provided with a semicircular portion 90 which extends partially around the insulating sleeve 62. These members are also provided with connecting portions 92 which terminate in U-shaped or bifurcated configurations 94 which partially surround the sleeve 42 and are in engagement respectively with the switch members 80 and 82 in the manner shown in FIGURE 3. The members 50 and 52, in assembly, are bent to the configurations shown in FIGURE 3.

As illustrated in FIGURE 2, a button or strut 98 of lava or ceramic is supported at the extremity of the thermoresponsive means or bimetallic element 70, the upper end of the button being disposed to engage the upper switch member or blade 80. When the thermoresponsive means 70 is subjected to heat, the distal portion thereof supporting the ceramic button 98 is flexed upwardly into engagement with the switch member 80, moving the latter in a direction to disengage the contacts 87 and 88 and thus interrupt the circuit through the appliance heating unit 12 and the supplemental heater provided by sections 56 of members 50 and 52.

The arrangement of the invention is inclusive of means for manually adjusting the relative position of the lower switch member 82 in order to predetermine the temperature at which the appliance is to be maintained. As shown in FIGURE 2, the plate or frame member 40 is provided with a collar 100 which is interiorly threaded to receive a threaded member or adjusting shaft 102. An adjusting screw (not shown) contained in a threaded bore in shaft 102 is recessed to accommodate a ceramic pin or strut 104 which extends through an opening in the switch member 80, the lower end of the pin engaging the switch member 82 in the manner shown in FIGURE 2.

The upper end region of the adjusting rod 102 is provided with a manipulating knob or dial 106 which is splined or otherwise connected with the rod 102 whereby rotation of the knob 106 rotates the adjusting rod 102. The knob or dial 106 is provided with temperature calibrations 110 which cooperate with an index 111 on the housing for indicating the temperature at which it is desired to maintain the appliance. By manually adjusting the knob 106 and rod 102, the lower switch member 82 may be flexed to a position at which the circuit through the contacts 87 and 88 may be made or interrupted, and the temperature automatically maintained by the alternate heating and cooling of the bimetallic element or thermoresponsive means 70 which influences the position of the switch blade 80.

The members 50 and 52 are provided with terminals or connectors 114 and 115 respectively as shown in FIGURE 5. One of the current supply conductors 36 is connected to the female terminal or connector 30 by means of a screw 32 and the other current supply conductor 37 is connected to the terminal 114 of member 50. The terminal 115 of member 52 is connected to the female connector 31 by means of the screw 33.

A pilot lamp 116 may be disposed adjacent a translucent sight opening or window 118 provided in the housing and is connected so as to be energized when the switch contacts 87 and 88 are in closed circuit position. Thus the pilot lamp 116 will be illuminated whenever electrical energy is flowing through the appliance heating unit 12.

The operation of the arrangement disclosed in FIGURES 1 through 6 inclusive is as follows: The control unit of the invention is connected to the appliance by inserting the probe bar 75 in the opening 77 and moving the housing 22 in a lefthand direction as viewed in FIGURES 1 and 2 until the prongs 15 and 16 forming the terminals of the appliance heating unit 12 are engaged in the female connectors 30 and 31 respectively. A guard plate 19 mounted on the appliance surrounds the end region of the housing 22. The control knob 106 is then adjusted to the temperature setting desired opposite the index 111 shown in FIGURE 1.

Rotation of the dial 106 rotates the adjusting rod 102 threading the same in the interior threaded region of the collar 100 which, through the medium of the ceramic pin 104, bends or flexes the lower switch member 82 to a particular position. When the appliance is "cold," the thermoresponsive means or bimetal element 70 is in its lowermost position and the ceramic strut 98 is out of engagement with the upper switch plate 80.

In this position of the elements of the switch mechanism the contacts 87 and 88 are in closed position completing a circuit through the heating element 12 of the appliance and through the connecting neck or restricted portions 56 of the components 50 and 52, the resistance of the cross sectional shape and dimension of the connecting neck sections 56 generating a small quantity of heat to influence the bimetal element 70 in addition to the heat transferred to the bimetal element through the probe bar 75 arranged in the appliance.

As the appliance becomes heated, the heat transferred to the bimetal element 70 from the probe bar 75 flexes the bimetal element 70 and such flexing is accelerated by the supplemental heat generated through the resistance sections 56 of the components 50 and 52. Heating of the bimetal element flexes the same in an upward direction bringing the ceramic pin 98 into engagement with the switch member 80 and, when the temperature in the bimetal element has flexed the same a distance sufficient to elevate the switch member 80 and disengage contact 87 from contact 88, the circuit through the appliance heating element 12 is interrupted.

Due to the fact that the appliance is cold, the first or initial application of electrical energy to the heating element 12 results in a slow transfer of heat to the bimetal element 70, and due to the initially cold condition of the probe bar, the temperature of the appliance will overrun or overshoot the temperature setting on the dial 106. As soon as the appliance temperature is lowered due to interruption of the electrical energy to the unit 12, the bimetal element cools, and the ceramic button 98 moves downwardly and contacts 87 and 88 are again engaged and current flow is again established through the heating element 12. As a result of the heated condition of the probe bar 75 supplemented by the heat from the supplemental heating units provided by the sections 56 in the current conductors 50 and 52, the heating of the appliance by the closing of the circuit results in rapid transfer of heat from the probe bar 75 to the bimetal element so that only a very minute rise in temperature in the appliance causes sufficient flexure in the bimetal element 70 to disconnect or disengage the contacts 87 and 88.

Thus this recycling continues automatically and the temperature of the appliance is held within a very narrow range, the temperature range of the cycling being dependent in a measure upon the sensitiveness of the thermoresponsive means or bimetal element 70. It is therefore desirable that the bimetal element 70 be extremely sensitive to minor changes in temperature so as to attain a substantially uniform temperature for the appliance.

In order to change the temperature at which it is desired to maintain the appliance, the dial 106 is rotated to effect a change in the relative position of the lower switch member 82, the extent of change of position of this member being dependent upon the position to which the dial 106 has been moved. The supplemental heat, provided by resistance to current flow through sections 56 of limited cross sectional area of members 50 and 52 whenever current flow is established through the appliance heating unit 12, accelerates or hastens the flexure of the bimetallic element 70 so that current flow through the appliance is interrupted without any appreciable overrun or overshooting of the temperature of the appliance.

Furthermore on initial heating of the appliance from a cold start, the supplemental heat from the heating sections 56 accelerates the flexure of the bimetallic element 70 and in this manner reduces the overrun of the initial heating cycle.

The plate 60 disposed beneath the supplemental heating means and the bimetallic element 70 serves to retard or delay the transfer of heat from the heating sections 56 to the bimetallic element to prevent too rapid action or flexure of the bimetal element 70 to an extent to provide sufficient period for the appliance to become reheated at each cycle by energy flow through the heating element 12.

If the heat from the supplemental heating means influences the bimetallic element 70 too rapidly, the current flow to the heating element 12 will be interrupted before the appliance reaches the temperature desired as established by the position of the dial 106.

It is to be understood that the cross sectional dimension or area of one or both the supplement heating sections 56 of the components 50 and 52 may be varied or regulated by changing the cross-sectional area thereof to attain the desired amount of heat for influencing the thermoresponsive means.

FIGURES 7 through 10 illustrate a modified form of supplemental heating means for the bimetal element or thermoresponsive means. In this arrangement the probe bar 75' is in direct metallic contact with the thermoresponsive means or bimetallic element 70', the latter being provided with the ceramic or lava strut or button 98'. The arrangement is inclusive of an upper switch blade or member 80' and a lower switch blade or member 82'.

The flattened portion 79' of the probe bar 75' and the bimetallic element 75 in direct metallic engagement are assembled in fixed relation together with the switch arms or blades 80' and 82' on the supporting sleeve or frame member 125. The switch blades 80' and 82' are insulated from the sleeve 125 by insulating collars 84' and 85'.

The frame member or plate 127 arranged as the uppermost component of the assembly has a threaded opening to receive the threaded portion 128 of an adjusting member 129 which is adapted to receive a manually knob (not shown) similar to the knob 106 shown in FIGURES 1 and 2. A ceramic pin 104' extends through a clearance opening in the upper switch blade 80' and engages the lower switch blade 82' to adjust the position of the latter to the temperature desired for the appliance.

Disposed adjacent and in metallic contact with the upper switch blade 80' is a current conductor 131 which has a terminal portion 132 to which a connection is made to the switch blade 80'. Disposed between sheets of mica or glass fiber cloth is a heating element 137 having a portion 139 bent upon itself as shown in FIGURE 8 and in direct metallic contact with the switch blade 82'. The heating element 137 being formed with a terminal portion 141 for connection in the electrical circuit of the appliance.

As shown in FIGURE 9, the switch blade or member 82', the mica or glass fiber insulating sheets 135 and the heating element 137 are joined together by means of a rivet 140, the resistance heating portions 138 being spaced from the rivet by means of a circular clearance opening 142 shown in FIGURES 9 and 10. Thus in this form of construction the resistance heating element 137 is riveted to the switch blade or member 82' and the passage of current through the portions 138 of restricted cross section sets up resistance which provides heat to influence and accelerate the action or flexure of the bimetallic element 70.'

The heating element 137 is in series with the circuit through the appliance heating unit. The user of the appliance adjusts the rod 129 so as to move the switch member 82' to the position at which the temperature of the appliance is to be maintained. When the contacts 80' and 82' are in closed position as when the appliance is cold, the contacts carried by the switch members establish a circuit through the heating element of the appliance and through the heating sections 138.

As the appliance becomes heated, the heat is transferred through the probe bar 75' to the bimetal element 70' which, accelerated by the heat generated from the resistance sections 138, is flexed upwardly bringing the ceramic pin 98' into engagement with the upper switch plate 80'.

The upward flexure of the bimetallic element 70' flexes the switch member 80 upwardly separating the contacts and interrupting the current flow through the heating element of the appliance.

Continued cycling of the current through the appliance is thereafter automatically maintained in the same manner as hereinbefore described with the form of the invention shown in FIGURES 1 through 6. In the form of the invention shown in FIGURES 7 through 10, the air space between the bimetallic element 70 and the auxiliary or supplemental heater 138 serves as a retarding medium to delay the influence of the supplemental heat upon the bimetallic element 70'.

FIGURE 11 is a modified form of the construction shown in FIGURES 7 through 10 wherein the probe element or bar 145 is angularly disposed with respect to the longitudinal axis of the sleeve frame member 125. The angularly disposed probe bar or element 145 is formed with a flat portion 147 which is assembled on the frame sleeve 125' in the same manner that the flat portion 79' is assembled on the sleeve construction as shown in FIGURE 7 and hereinbefore described.

The angularity of the probe bar relative to the bimetal element 70'' may vary depending upon the particular construction of the appliance with which the thermostatic switch control mechanism is used. It is to be understood that a casing or housing (not shown) is provided for the arrangement shown in FIGURE 11 and is of a configuration to facilitate the insertion of the probe 145 into a suitable opening in the appliance and to facilitate the connection of the prongs of the appliance with female connectors mounted in the casing or housing.

It is apparent that, within the scope of the invention, modifications and different arrangements may be made other than is herein disclosed, and the present disclosure is illustrative merely, the invention comprehending all variations thereof.

I claim:

1. A combined current connector and circuit controlling means for electrically heated appliances including a housing, a pair of terminal connectors in said housing adapted to be engaged with terminals of a heating unit of an appliance, switch means including a support in said housing, contact-carrying switch members secured to the support, a bimetallic element secured to the support and arranged to actuate one of the switch members, manually operable means for controlling the relative position of the other of said members, a probe bar carried by the support and having a flat portion at one end in heat-transferring contact with the flat end region of the bimetallic element, said bar and bimetalic element extending laterally of the support in opposite directions and in generally aligned relation, a relatively fixed electrically-energizable heating element mounted by the support arranged to influence the bimetallic element, insulating means enclosing the heating element, and means securing the insulating means to one of the switch members.

2. A combined current connector and circuit controlling means for electrically heated appliances including a housing, a pair of terminal connectors in said housing adapted to be engaged with terminals of a heating unit of an appliance, switch means including a cylindrical support in said housing, contact-carrying switch members secured to the support, an elongated bimetallic element secured to the support and arranged to actuate one of the switch members, manually operable means for controlling the relative position of the other of said switch members, a probe bar carried by the support and having a flat surface portion in direct contact with a flat surface of the bimetallic element, said probe bar extending in a direction normal to the axis of the cylindrical support, a relatively fixed electrically energizable heating element mounted by the support arranged to influence the bimetallic means, and a heat-transfer retarding means disposed between the bimetallic element and the heating element.

3. A control unit for use with electrically energizable heating appliances, in combination, a housing, switch mechanism supported within the housing, said switch mechansm including a pair of flexible switch blades, contacts carried by said switch blades and adapted when in contacting relation to establish a circuit through the appliance, a frame member supporting said switch blades, a thermoresponsive element, a probe element, said thermoresponsive and probe elements being secured to the frame member and extending laterally from the frame member, said thermoresponsive and probe elements being in direct engagement, a strut arranged between the thermoresponsive element and one of said switch blades whereby flexure of the thermoresponsive element affects the position of the switch blade engaged by the strut, a plate associated with the frame member, manually rotatable means carried by the plate and engageable with the other of said switch members for adjusting the relative position thereof, a current conducting element disposed adjacent and insulated from the manually adjusted switch blade, said element having a restricted section providing resistance to current flow forming an electrically energized heating means for influencing the position of said thermoresponsive means, and means spaced from the support for securng the current conducting element in fixed relation to the manually adjustable switch blade.

References Cited in the file of this patent

UNITED STATES PATENTS

| | | |
|---|---|---|
| Re. 20,570 | Bushway | Dec. 7, 1937 |
| 1,431,542 | Ross | Oct. 10, 1922 |
| 1,662,817 | Bollmann et al. | Mar. 20, 1928 |

(Other references on following page)

UNITED STATES PATENTS

| | | |
|---|---|---|
| 1,813,267 | Arnesen | July 7, 1931 |
| 1,850,206 | Hertzberg | Mar. 22, 1932 |
| 1,857,906 | Wolcott et al. | May 10, 1932 |
| 2,024,471 | Norton | Dec. 17, 1935 |
| 2,371,018 | Ashworth et al. | Mar. 6, 1945 |
| 2,409,420 | Clark | Oct. 15, 1946 |
| 2,641,668 | Larocco | June 9, 1953 |
| 2,673,444 | Clapp | Mar. 30, 1954 |
| 2,718,572 | Harris | Sept. 20, 1955 |
| 2,753,437 | Mertler | July 3, 1956 |
| 2,762,885 | Foster | Sept. 11, 1956 |
| 2,768,263 | Callihan | Oct. 23, 1956 |
| 2,774,846 | Lee | Dec. 18, 1956 |
| 2,886,686 | Knapp | May 12, 1959 |
| 2,946,359 | Sheahan | May 10, 1960 |

FOREIGN PATENTS

| | | |
|---|---|---|
| 543,995 | Germany | Feb. 12, 1932 |
| 599,517 | Great Britain | Mar. 15, 1948 |
| 725,341 | Great Britain | Mar. 2, 1955 |